(12) United States Patent
Lecomte et al.

(10) Patent No.: US 9,790,122 B2
(45) Date of Patent: Oct. 17, 2017

(54) ALKALI-AND ACID-RESISTANT GLASS COMPOSITION FOR THE MANUFACTURE OF GLASS STRANDS

(75) Inventors: Emmanuel Lecomte, Aulnay Sous Bois (FR); Eric Dallies, La Ravoire (FR); Anne Berthereau, Challes les Eaux (FR)

(73) Assignee: OCV Intellectual Capital, LLC, Toledo, OH (US)

( * ) Notice: Subject to any disclaimer, the term of this patent is extended or adjusted under 35 U.S.C. 154(b) by 644 days.

(21) Appl. No.: 12/091,615

(22) PCT Filed: Oct. 23, 2006

(86) PCT No.: PCT/FR2006/051085
§ 371 (c)(1),
(2), (4) Date: May 20, 2009

(87) PCT Pub. No.: WO2007/048965
PCT Pub. Date: May 3, 2007

(65) Prior Publication Data
US 2009/0305053 A1    Dec. 10, 2009

(30) Foreign Application Priority Data

Oct. 28, 2005  (FR) ..................... 05 53288

(51) Int. Cl.
| B32B 17/06 | (2006.01) |
| C03C 13/02 | (2006.01) |
| C03C 3/087 | (2006.01) |
| C03C 13/00 | (2006.01) |

(52) U.S. Cl.
CPC ............ C03C 3/087 (2013.01); C03C 13/002 (2013.01)

(58) Field of Classification Search
CPC ............................. C03C 3/078; C03C 13/002
USPC ............... 106/50, 54, 52, 99, 692, 715, 711;
501/70, 72, 335, 6, 38, 57–59, 63, 64, 65;
428/426, 365
See application file for complete search history.

(56) References Cited

U.S. PATENT DOCUMENTS

| 2,640,784 | A | * | 6/1953 | Tiede et al. ................. 501/38 |
| 2,877,124 | A | * | 3/1959 | Welsch ........................ 501/38 |
| 3,861,926 | A | * | 1/1975 | Irlam et al. ................. 501/38 |
| 3,973,974 | A | * | 8/1976 | Ohtomo et al. ............ 501/38 |
| 4,014,705 | A | | 3/1977 | Yale |
| 4,054,472 | A | | 10/1977 | Kondo |
| 4,062,689 | A | * | 12/1977 | Suzuki et al. .............. 501/38 |
| 4,065,317 | A | | 12/1977 | Baak et al. |
| 4,066,465 | A | * | 1/1978 | Mohri et al. ............... 501/38 |
| 4,140,533 | A | * | 2/1979 | Ohtomo et al. ............ 501/38 |
| 4,189,422 | A | | 2/1980 | Wakeford |
| 4,234,342 | A | | 11/1980 | Wakasa |
| 4,260,538 | A | | 4/1981 | Iseler |
| 4,345,037 | A | * | 8/1982 | Fyles ..................... C04B 14/42 |
| | | | | 106/711 |
| 5,064,785 | A | | 11/1991 | Kawamoto et al. |
| 6,627,569 | B1 | * | 9/2003 | Naumann et al. ............. 501/70 |
| 6,630,420 | B1 | | 10/2003 | Naumann et al. |
| 6,773,500 | B1 | * | 8/2004 | Creamer .................. B28B 1/50 |
| | | | | 106/672 |
| 7,273,668 | B2 | | 9/2007 | Kurachi et al. |
| 7,629,279 | B2 | | 12/2009 | Tanaka |
| 2005/0003136 | A1 | | 1/2005 | Kurachi et al. |
| 2005/0147816 | A1 | | 7/2005 | Dallies et al. |
| 2010/0152333 | A1 | | 6/2010 | Berthereau et al. |
| 2013/0333594 | A1 | | 12/2013 | Berthereau |

FOREIGN PATENT DOCUMENTS

| CN | 1046147 | 10/1990 |
| CN | 1149031 | 5/1997 |
| CN | 1500763 | 6/2004 |
| DE | 2656002 | 6/1978 |

(Continued)

OTHER PUBLICATIONS

International Search Report PCT/FR2006/051085 dated Apr. 29, 2008.
Office action from Japanese Application No. 2008-537155 dated Aug. 20, 2012.
International Search Report and Written Opinion from PCT/FR07/052241 dated Apr. 9, 2008.
Office action from U.S. Appl. No. 12/446,778 dated Jun. 28, 2012.
Office action from U.S. Appl. No. 12/446,778 dated Jan. 7, 2013.
Notice of Allowance from U.S. Appl. No. 12/446,778 dated May 22, 2013.

(Continued)

*Primary Examiner* — Jennifer Chriss
*Assistant Examiner* — Ricardo E Lopez
(74) *Attorney, Agent, or Firm* — Calfee, Halter & Griswold LLP

(57) ABSTRACT

The present invention relates to a glass composition which is resistant to alkalis and to acids, in particular for the preparation of reinforcing glass strands, which comprises the following constituents within the limits defined below, as percentages by weight:

| $SiO_2$ | $\geq 58\%$, preferably $\leq 65\%$ |
| $ZrO_2$ | 15-20% |
| $R_2O$ (R = Na, K or Li) | $\geq 14\%$ |
| $K_2O$ | $\leq 0.1\%$, preferably $\leq 0.05\%$, |
| RO (R = Mg, Ca or Sr) | 2.5-6% |
| MgO | $\leq 4\%$ |
| $TiO_2$ | $>1$ and $\leq 4\%$ | the composition additionally being devoid of F, comprising less than 1% of impurities ($Al_2O_3$, $Fe_2O_3$ and $Cr_2O_3$) and satisfying the following relationships:

$ZrO_2 + TiO_2 \geq 17\%$ $ZrO_2 / TiO_2 \geq 6$

It also relates to the use of the glass strands obtained in the reinforcing of inorganic materials, for example cementitious materials, or organic materials, for example plastics, and to the composites including such strands.

15 Claims, No Drawings

(56) References Cited

FOREIGN PATENT DOCUMENTS

| | | | |
|---|---|---|---|
| DE | 293105 | | 8/1991 |
| EP | 500325 | | 8/1992 |
| FR | 2 451 347 | | 10/1980 |
| FR | 2651223 | | 3/1991 |
| FR | 2 809 389 | | 11/2001 |
| FR | 2 837 818 | | 10/2003 |
| FR | 2 864 972 | | 7/2005 |
| GB | 965018 | | 7/1964 |
| GB | 1290528 | A * | 4/1977 |
| GB | 2 009 141 | | 6/1979 |
| GB | 2 071 081 | | 9/1981 |
| JP | 55-140735 | | 11/1980 |
| JP | 56-134534 | | 10/1981 |
| JP | 58-088138 | | 5/1983 |
| JP | 61-236633 | | 10/1986 |
| JP | 62-292839 | | 12/1987 |
| JP | 63-107556 | | 5/1988 |
| JP | 3-080130 | | 4/1991 |
| JP | 5-085767 | | 4/1993 |
| JP | 9-156957 | | 6/1997 |
| JP | 11-292562 | | 10/1999 |
| JP | 2000-072519 | | 3/2000 |
| JP | 2000-186787 | | 7/2000 |
| JP | 2002-060252 | | 2/2002 |
| JP | 2003-002696 | | 1/2003 |
| SU | 1512938 | | 10/1989 |
| WO | WO 92/06931 | | 4/1992 |
| WO | WO 01/90017 | | 11/2001 |
| WO | 2004/035497 | | 4/2004 |
| WO | WO 2005/071152 | | 8/2005 |
| WO | 2006/090030 | | 8/2006 |
| WO | 2007/048965 | | 5/2007 |
| WO | 2008/050069 | | 5/2008 |

OTHER PUBLICATIONS

Office action from Chinese Application No. 200680044186.4 dated Nov. 20, 2009.
Office action from Chinese Application No. 200780039750.8 dated Aug. 4, 2010.
Office action from Chinese Application No. 200780039750.8 dated Apr. 20, 2011.
Office action from Chinese Application No. 200780039750.8 dated Oct. 19, 2011.
Search Report from French Patent No. 553,288 dated Oct. 12, 2006.
Third Party Objections from Japanese Application No. 2008-537155 dated Feb. 22, 2012.
Office action from Japanese Application No. 2009-533917 dated Sep. 24, 2012.
Office action from Mexican Application No. 09/04482 dated Oct. 25, 2013 along with English translation of relevant portions of action.
Office action from Russian Application No. 2009119558 dated Oct. 7, 2011.
Tekhnologia Stekla (Glass technology), under the editorship of I.II. Kitalgorodsky, Moscow, Stroyizdat, 1961, pp. 43-44.
Office action from Mexican Application No. 09/04482 dated Jul. 17, 2014 along with English translation of relevant portions of action.
English translation of Office action from Chinese Application No. 200680044186.4 dated Nov. 20, 2009.
Office action from U.S. Appl. No. 12/091,615 dated Mar. 15, 2012.
Office action from U.S. Appl. No. 12/091,615 dated Feb. 1, 2013.
Office action from U.S. Appl. No. 12/091,615 dated Jun. 18, 2013.
Office action from U.S. Appl. No. 12/091,615 dated May 21, 2014.
Office action from Indian Application No. 1529/KOLNP/2009 dated Mar. 26, 2014.
Office action from European Application No. 07866485.1 dated Apr. 4, 2014, 5 pgs.
Office action from European Application No. 07866485.1 dated Sep. 12, 2014.
Office action from U.S. Appl. No. 12/446,778 dated Dec. 18, 2014.
Interview Summary from U.S. Appl. No. 12/446,778 dated Apr. 22, 2015.
Office action from U.S. Appl. No. 13/973,124 dated Sep. 25, 2015.
Notice of Allowance from U.S. Appl. No. 12/446,778 dated Aug. 11, 2015.
Notice of allowance from U.S. Appl. No. 13/973,124 dated Jul. 22, 2016.
Supplemental Notice of allowance from U.S. Appl. No. 13/973,124 dated Aug. 16, 2016.
Office action from U.S. Appl. No. 13/973,124 dated Apr. 21, 2016.
Office action from Indian Application No. 1949/KOLNP/2008 dated Jun. 23, 2016.
Office action from U.S. Appl. No. 13/973,124 dated Apr. 12, 2017.
Office action from U.S. Appl. No. 13/973,124 dated Dec. 7, 2016.
Interview Summary from U.S. Appl. No. 13/973,124 dated Jul. 5, 2017.

* cited by examiner

ALKALI- AND ACID-RESISTANT GLASS COMPOSITION FOR THE MANUFACTURE OF GLASS STRANDS

This application is the U.S. National Stage Entry of International Application No. PCT/FR2006/051085, filed Oct. 23, 2006, which claims priority to French Patent Application No. 0553288, filed Oct. 28, 2005.

The invention relates to an alkali- and acid-resistant glass composition for the preparation of glass strands intended for the reinforcing of inorganic or organic materials, to the glass strands obtained and to the reinforced products (or composites) including such strands.

It has been known for a long time to use alkali-resistant glass strands to reinforce highly basic materials, for example cement-based materials. However, when the glass strands are mixed with the cement, they are progressively damaged and can break. The glass strands, thus damaged, no longer correctly carry out their reinforcing function: the mechanical properties of the reinforced material, in particular the tensile strength and the flexural strength, are reduced, which affects its sturdiness.

Conventionally, resistance to alkalis is obtained by adding zirconium oxide $ZrO_2$ to the glass composition. However, the addition of $ZrO_2$ substantially increases the viscosity of the glass and raises the forming temperature (that is to say, the temperature at which the glass has a viscosity of equal to $10^3$ poises, recorded as $T_{Log\ \eta=3}$), which has the consequence of damaging the bushing from which the glass filaments are obtained and drawn mechanically before being gathered together into strand(s).

In addition, the introduction of $ZrO_2$ into the glass composition has the effect of increasing the liquidus temperature of the glass (that is to say, the temperature at which the first crystals appear when the molten glass is slowly cooled, recorded as $T_{liq}$) and thereby of increasing the risk of devitrification of the glass during melting and formation of the strands, in this case causing the filaments to break.

For these reasons, the known alkali-resistant glass compositions generally comprise a relatively low amount of $ZrO_2$ and of other compounds in order to make possible the formation of the glass strands under acceptable conditions.

For example, glass compositions comprising 8 to 25% by weight of $ZrO_2$ are disclosed in SU-A-151298, DD-A-293105 and U.S. Pat. No. 6,627,569.

Other glass compositions based on the addition of $TiO_2$ to improve the fiberizing conditions are disclosed in WO-A-92/06931, U.S. Pat. No. 5,064,785, CN-A-1500763 and CN-A-1046147.

U.S. Pat. No. 4,345,037 discloses alkali-resistant glass fibers for the reinforcing of cement which comprise 0.1 to 1% by weight of $Cr_2O_3$ and 0.5 to 16% by weight of at least one rare earth metal oxide and of $TiO_2$. The resistance to alkalis is obtained here by melting under nonoxidizing conditions, so that a substantial proportion of the chromium is in the form of trivalent chromium. However, these fibers are capable of comprising hexavalent chromium, known for its toxic nature towards living beings.

Furthermore, it is known to use glass strands comprising $ZrO_2$ in order to reinforce plastics of the polyester type.

GB-A-96 5018 discloses the manufacture of glass strands possessing high light transmission based on the combination of 3 to 10% of $ZrO_2$, 4 to 12% of $Al_2O_3$ and 3 to 10% of CaO. The glass strands additionally have a good hydrolytic resistance and good resistance to acids.

The aim of the present invention is to provide a glass composition which makes possible the preparation of glass strands which can be used without distinction to reinforce basic materials, in particular cement-based materials, and plastics intended to have to come into contact with acids, it being possible for the composition to be processed under the normal conditions of existing fiberizing plants and at low cost.

This aim is achieved by virtue of the glass composition which is resistant to bases and to acids for the manufacture of glass strands, this composition being characterized in that it comprises the following constituents within the limits defined below, expressed as percentages by weight:

| | |
|---|---|
| $SiO_2$ | ≥58%, preferably ≤65% |
| $ZrO_2$ | 15-20% |
| $R_2O$ (R = Na, K or Li) | ≥14% |
| $K_2O$ | ≤0.1%, preferably ≤0.05%, |
| RO (R = Mg, Ca or Sr) | 2.5-6% |
| MgO | ≤4% |
| $TiO_2$ | >1 and ≤4% | the composition additionally being devoid of F, comprising less than 1% of impurities ($Al_2O_3$, $Fe_2O_3$ and $Cr_2O_3$) and satisfying the following relationships:

$$ZrO_2 + TiO_2 \geq 17\%$$

$$ZrO_2/TiO_2 \geq 6$$

According to one characteristic of the invention, the glass composition is characterized in that the difference between the forming temperature of the strands ($T_{Log\ \eta=3}$) and the liquidus temperature ($T_{liq}$) is at least equal to 60° C., which is sufficient for the fiberizing of the glass to be carried out under good conditions. Preferably, this difference is at least equal to 80° C.

In addition, the forming temperature is at most equal to 1320° C. and is preferably less than or equal to 1310° C., corresponding to a temperature which is entirely acceptable as it does not require heating the glass excessively intensively and it makes it possible to reduce the wear on the bushing to a minimum.

According to another characteristic of the invention, the glass composition satisfies the relationship $Na_2O/ZrO_2 \geq 0.75$.

$SiO_2$ is the oxide which forms the network of the glasses according to the invention and plays an essential role in their stability. In the context of the invention, when the level of $SiO_2$ is less than 58%, the viscosity of the glass becomes excessively low and the risks of devitrification of the glass during fiberizing are enhanced. Generally, the level of $SiO_2$ is kept below or equal to 65% as, above this value, the glass becomes very viscous and difficult to melt. Preferably, the level of $SiO_2$ varies from 59 to 63%.

$ZrO_2$ is essential in conferring resistance to alkalis on the glass and its level consequently has to be at least equal to 15%. In addition, $ZrO_2$ contributes to the improvement in the resistance to acids. Preferably, when the level of $ZrO_2$ exceeds 18%, the level of $TiO_2$ is at least equal to 1%, so as to obtain a satisfactory liquidus temperature. A level of $ZrO_2$ of greater than 20% increases the risk of devitrification during fiberizing.

$Na_2O$ and $Li_2O$ are both used as fluxes to improve the melting of the glass, making it possible in particular to reduce the viscosity and to obtain better dissolution of the $ZrO_2$ in the glass. Preferably, the $Li_2O$ content is less than 0.5%, so as not to excessively increase the price of the glass (the starting material for $Li_2O$ being expensive), and is preferably zero.

The presence in the glass composition of $K_2O$ as flux is undesirable, essentially for reasons related to the high cost of the starting material comprising it, which represents a large part of the price of the final glass. $K_2O$ can be present as impurity in the vitrifiable starting materials, at a level of less than or equal to 0.1%, preferably of less than or equal to 0.05%. Particularly preferably, the glass composition is devoid of $K_2O$.

In accordance with the invention, the level of $R_2O$ is greater than or equal to 14% and is preferably less than 18%, in order to avoid damaging the hydrolytic resistance of the glass.

MgO, CaO and SrO make it possible to adjust the viscosity of the glass and to control the devitrification. The level of MgO is kept below 4%, in order to retain an acceptable liquidus temperature generally of less than 1220° C., and this level is preferably zero. Generally, the glass composition is devoid of SrO.

The level of RO is between 2.5 and 6%. A level of less than 2.5% reduces the hydrolytic resistance of the glass. Above 6%, the solubility of $ZrO_2$ in the glass decreases.

$TiO_2$ acts as viscosity reducer and contributes to increasing the resistance to alkalis and acids. The level of $TiO_2$ is greater than 1%. Above 4%, the risk of devitrification increases and the glass exhibits a very pronounced yellow coloring.

The glass composition is devoid of F, an undesirable element which generates polluting emissions during melting and corrodes the refractory components of the furnace.

The glass composition according to the invention can comprise up to 1% of unavoidable impurities contributed by the starting materials used to prepare the glass and/or originating from the refractory components of the furnace. The impurities are composed of $Al_2O_3$, of iron oxides (expressed in the form of $Fe_2O_3$) and of $Cr_2O_3$. The level of $Al_2O_3$ is generally less than 0.5%. Preferably, the level of $Fe_2O_3$ does not exceed 0.5% in order not to inflict totally unacceptable damage on the color of the glass strands and not to detrimentally affect in a completely unacceptable way the operation of the fiberizing plant, in particular the transfers of heat in the furnace. Preferably again, the level of $Cr_2O_3$ is less than 0.05% and better still is zero.

The glass strands are obtained, from the glass composition described above, according to the following process: a multiplicity of molten glass streams, flowing out of a multiplicity of orifices positioned at the base of one or more bushings, is drawn in the form of one or more webs of continuous filaments and then the filaments are gathered together into one or more strands which are collected on a moving support. This can be a rotating support, when the strands are collected in the form of wound packages, or a support moving translationally, when the strands are cut by a member which is also used to draw them or when the strands are sprayed by a member which is used to draw them, so as to form a mat.

The strands obtained, optionally after other conversion operations, can thus be provided in various forms: continuous or cut strands, woven fabrics, knitted fabrics, braids, tapes or mats, these strands being composed of filaments with a diameter which can range from 5 to 30 micrometers approximately.

The molten glass which feeds the bushings is obtained from pure starting materials or, generally, from natural starting materials (that is to say, materials which can comprise impurities in the form of traces), these materials being mixed in appropriate proportions and then being melted. The temperature of the molten glass is adjusted conventionally so as to make the fiberizing possible and to avoid problems of devitrification. Before they are gathered into the form of strands, the filaments are generally coated with a sizing composition which is targeted at protecting them from abrasion and which makes it easier to subsequently combine them with the materials to be reinforced. The sizing composition can be an aqueous or anhydrous composition (comprising less than 5% by weight of solvent), for example disclosed in WO-A-01/90017 and FR-A-2837818. If appropriate, before and/or after collecting, the strands can be subjected to a heat treatment with the aim of drying them and/or of polymerizing the sizing agent.

The glass strands obtained can thus be used to reinforce inorganic materials, in particular highly basic inorganic materials, such as cementitious materials, and organic materials, in particular plastics.

The inorganic materials capable of being reinforced are in particular cementitious materials, such as cement, concrete, mortar, gypsum, slag, the compounds formed by reaction of lime, of silica and of water, and the mixtures of these materials with other materials, for example the mixtures of cement, of polymers and of fillers (coatings).

The reinforcing can be carried out directly by incorporation of the glass strands in the cementitious material or indirectly starting from glass strands combined beforehand with an organic material, for example to form composite components which can be used as rebars for reinforced concrete.

The organic materials capable of being reinforced by the glass strands according to the invention are thermoplastics or thermosetting plastics, preferably thermosetting plastics.

Mention may be made, as examples of thermoplastics, of polyolefins, such as polyethylene, polypropylene and polybutylene, polyesters, such as polyethylene terephthalate and polybutylene terephthalate, polyamides, polyurethanes and the blends of these compounds.

Mention may be made, as examples of thermosetting materials, of polyesters, for example vinyl ester resins, phenolic resins, epoxy resins, polyacrylics and the blends of these compounds. Preference is given to vinyl ester resins, in particular of isophthalic type, which withstand corrosion better.

As already indicated above, it is possible to use the glass strands in the form of continuous strands (for example in the form of cakes or of rovings, of meshes, of woven fabrics, and the like) or cut strands (for example in the form of nonwoven fabrics, such as veils or mats) and their presentation depends on the nature of the material to be reinforced and on the process employed.

The continuous glass strands according to the invention can thus be used for the manufacture of hollow bodies, such as pipes or tanks, by the known technique operating by filament winding, which consists in depositing a reinforcement, for example a roving web, impregnated with organic material on a mandrel rotating about its axis. Such hollow bodies are intended in particular for the collecting and discharge of wastewater (pipes) and for the storage or transportation of chemicals (tanks and containers). For their part, the cut strands are suitable for the reinforcing of paints or mastics and the production of composites by contact molding.

Wound packages of strands can be used to produce meshes or woven fabrics used as crack-resistant or earthquake-resistant components in cementitious materials or to restore civil engineering structures (bridges, tunnels, roads, and the like). The wound packages can also be used to manufacture composite profiles by pultrusion, that is to say by passing a reinforcement impregnated with organic material through a heated bushing. These composite profiles are used in particular as structural parts in industries where the materials have to have a high resistance to alkalis and to acids, for example the chemical, oil and port industries.

The glass strands are generally incorporated in the inorganic or organic material to be reinforced in a proportion such that the glass represents 15 to 80% by volume of the final material, preferably 20 to 60% by volume.

In the final composite, the glass strands can be the only components for reinforcing the inorganic or organic material or they can be used in combination with other components, such as metal wires and/or inorganic threads, in particular ceramic wires.

The glass composition in accordance with the invention makes possible the preparation of glass strands having a resistance to alkalis comparable with that of the glass strands used for the reinforcing of basic materials and having an improved resistance to acids, can be fiberized in conventional plants without modification of the operating conditions, and is economical.

The composites obtained from these reinforcing strands exhibit good mechanical properties in a wet and acidic, basic, corrosive medium, including when the latter is capable of changing over time, the improvement being visible under acid corrosion conditions.

The examples which follow make it possible to illustrate the invention without, however, limiting it.

Strands composed of glass filaments with a diameter of 17 μm are obtained by drawing streams of molten glass having the composition which appears in table 1, expressed as percentages by weight.

On their journey, the filaments are coated with an aqueous sizing agent before being gathered together into strands which are subsequently collected in the form of wound packages.

Use is made, in the production of glass strands for the reinforcing of cementitious materials, of a conventional sizing agent capable of preventing the cracking of concrete (anti-crack HD® sizing agent from Saint-Gobain). The strands obtained are collected in the form of cakes.

Use is made, in the preparation of glass strands for the reinforcing of plastics, of a sizing agent as described in example 1 of patent FR 2 809 389. The strands are collected in the form of rovings.

The strands are dried at 130° C. for 12 hours before being incorporated in the cementitious materials or plastics to form composites.

The use of the strand and the mechanical tests on the composites are described below.

A—Reinforcing of Cementitious Materials

A composite is formed comprising a glass strand, the central part of which is sealed in a block of cement. The strand is placed at the centre of a mold with the internal dimensions: L=30 mm; H=10 mm; D=10 mm) and then the mold is filled with cement with the composition (in parts by weight): 75 parts of Portland cement, 25 parts of sand and 32 parts of water. The composite is treated under the following conditions: 20-25° C. at 90-100% relative humidity for 24 hours.

The composite is subsequently subjected to an ageing test by immersion in water at 80° C. for 4 days. The tensile strength of the strand, in MPa, conventionally referred to as "SIC (Stand In Cement) stress", is measured on the composite. The SIC stress is representative of the sensitivity of the glass to alkaline attack by the cement.

The SIC stress values and the gain (in %) with respect to example 11 (reference) are given in table 1.

B—Reinforcing of Plastics

The glass strands are used to form composite sheets comprising parallel strands in accordance with standard ISO 1268-5. The reinforced resin is an isophthalic polyester resin sold under the reference "Synolite 1717" by DSM, to which 1.5 parts of curing agent (reference Trigonox HM, sold by Akzo) are added per 100 parts by weight of resin.

Each sheet comprises 50% by volume of glass and has a thickness of 3 mm. The sheets are subsequently treated at 80° C. for 2 hours and then at 120° C. for 4 hours to bring about the complete crosslinking of the resin. The sheets are separated into two series subjected to the following tests:

a) Flexural Strength

With regard to the first series, the tensile strength of the sheets is measured in the three-point bending test according to standard ISO 14125, in MPa, before and after treatment in boiling water for 24 hours. The value of the flexural tensile strength, standardized for 100% of glass, is given in table 1.

The flexural tensile strength is representative of the resistance of the glass strands to attack by water under accelerated ageing conditions.

b) Resistance to Acids

The sheets of the second series are protected at the edges by a layer of an epoxy resin with a thickness of 1 to 2 mm and then each sheet is placed under a constant given stress in the three-point bending test in an acidic solution (1N HCl; 25° C.). The failure time of the composite under the flexural stress conditions (standard ISO 14125) is measured and the curve of the flexural tensile strength as a function of time is plotted. The value of the flexural stress ("CUS stress"— Corrosion Under Stress), in MPa, necessary to produce failure of the composite after ageing for 1000 hours is determined on this curve.

The measurement of the CUS stress is given in table 1.

Examples 1 to 6 are examples according to the invention and examples 7 to 11 are comparative examples.

Examples 7 to 9 correspond to glass compositions exhibiting a $ZrO_2/TiO_2$ ratio by weight of less than 6.

Example 10 corresponds to a glass composition for the preparation of alkali-resistant strands for the reinforcing of cementitious materials (Cem-FIL®, sold by Saint-Gobain Vetrotex).

Example 11 corresponds to another composition based on $K_2O$ which makes possible the preparation of alkali-resistant glass strands for the reinforcing of cementitious materials.

The strands according to the invention combine good properties of resistance to alkalis, in particular an SIC stress which is improved with respect to that of example 10 and comparable with that of example 11, and better resistance to acids.

The difference in temperature $T_{Log\ \eta=3}-T_{liq}$ is in addition much greater than the values of comparative examples 7 to 9 and of the same order of magnitude as that of example 10.

TABLE 1

| Example | 1 | 2 | 3 | 4 | 5 | 6 | 7 | 8 | 9 | 10 | 11 |
|---|---|---|---|---|---|---|---|---|---|---|---|
| $SiO_2$ (%) | 61.10 | 60.10 | 61.60 | 60.60 | 59.85 | 59.85 | 59.10 | 59.10 | 61.10 | 61.80 | 60.25 |
| $ZrO_2$ (%) | 17.50 | 17.05 | 17.05 | 18.05 | 19.00 | 18.00 | 18.05 | 18.05 | 17.05 | 16.70 | 19.20 |
| $Al_2O_3$ | 0.40 | 0.40 | 0.40 | 0.40 | 0.40 | 0.40 | 0.40 | 0.40 | 0.40 | 0.40 | 0.25 |
| $Na_2O$ (%) | 14.00 | 14.45 | 14.45 | 14.45 | 16.00 | 16.05 | 13.45 | 14.45 | 13.45 | 14.80 | 13.95 |
| CaO (%) | 5.00 | 5.75 | 4.25 | 4.25 | 3.00 | 3.00 | 5.75 | 4.75 | 4.75 | 5.80 | 0.60 |
| $TiO_2$ (%) | 2.00 | 2.25 | 2.25 | 2.25 | 1.75 | 2.25 | 3.25 | 3.25 | 3.25 | 0.10 | 1.90 |
| $K_2O$ (%) | — | — | — | — | — | — | — | — | — | — | 2.35 |
| $Li_2O$ | — | — | — | — | — | — | — | — | — | — | 1.1 |
| $ZrO_2 + TiO_2$ (%) | 19.50 | 19.30 | 19.30 | 20.30 | 20.75 | 20.25 | 21.30 | 21.30 | 20.30 | 17.00 | 21.00 |
| $ZrO_2/TiO_2$ (%) | 9.00 | 8.00 | 8.00 | 8.00 | 11.00 | 8.00 | 5.6 | 5.6 | 5.00 | 167.00 | 10.00 |
| $T_{Log\,\eta=3}$ (°C.) | 1300 | 1281 | 1300 | 1302 | 1303 | 1283 | 1299 | 1293 | 1280 | 1290 | 1287 |
| $T_{liq}$ (°C.) | 1200 | 1190 | 1170 | 1190 | 1210 | n.d. | 1300 | 1270 | 1250 | 1180 | 1140 |
| $T_{Log\,\eta=3} - T_{liq}$ (°C.) | 100 | 91 | 130 | 112 | 93 | n.d. | −1 | 23 | 30 | 110 | 147 |
| Resistance to alkalis | | | | | | | | | | | |
| SIC stress (MPa) | n.d. | n.d. | n.d. | 425 (+21%) | n.d. | n.d. | n.d. | n.d. | n.d. | 350 | 430 |
| Wet ageing | | | | | | | | | | | |
| Before (MPa) | n.d. | n.d. | n.d. | 2160 | n.d. | n.d. | n.d. | n.d. | n.d. | 2350 | n.d. |
| After (MPa) | n.d. | n.d. | n.d. | 960 | n.d. | n.d. | n.d. | n.d. | n.d. | 1110 | n.d. |
| Residual flexural strength (%) | n.d. | n.d. | n.d. | 45 | n.d. | n.d. | n.d. | n.d. | n.d. | 47 | n.d. |
| Resistance to acids | | | | | | | | | | | |
| CUS stress (MPa) | n.d. | n.d. | n.d. | 950 | n.d. | n.d. | n.d. | n.d. | n.d. | 700 | n.d. |

What is claimed is:

1. An alkali and acid resistant glass composition, the glass composition consisting essentially of, as percentages by weight of the glass composition:

| | |
|---|---|
| $SiO_2$ | ≥58.0%; |
| $ZrO_2$ | 15.0-20.0%; |
| $Na_2O$ | ≥14.0%; |
| $K_2O$ | ≤0.1%; |
| $Li_2O$ | <0.5%; |
| CaO | 2.5-5.0%; |
| $TiO_2$ | ≥1.0% and ≤2.25%; |
| $Fe_2O_3$ | <1.0%; |
| $Al_2O_3$ | >0 and <0.5%; |
| $Cr_2O_3$ | ≤0.05%; |
| $ZrO_2 + TiO_2$ | ≥17.0%; and |
| $ZrO_2/TiO_2$ | ≥6; | wherein the glass composition is devoid of F,
wherein the difference between a forming temperature and a liquidus temperature of the glass composition is at least 60.0° C., and
wherein the glass composition has a forming temperature no greater than 1,320° C.

2. The glass composition of claim 1, wherein the glass composition satisfies the relationship $Na_2O/ZrO_2 \geq 0.75$.

3. The glass composition of claim 1, wherein the glass composition is devoid of $Li_2O$.

4. The glass composition of claim 1, wherein the glass composition is devoid of SrO and MgO.

5. The glass composition of claim 1, wherein the glass composition includes ≤65.0 wt. % of $SiO_2$, based on the weight of the total glass composition.

6. The glass composition of claim 1, wherein the glass composition includes ≤0.05 wt. % of $K_2O$, based on the weight of the total glass composition.

7. The glass composition of claim 1, wherein the difference between the forming temperature and the liquidus temperature of the glass composition is at least 80.0° C.

8. The glass composition of claim 1, wherein the forming temperature is no greater than 1,310° C.

9. A glass strand formed from an alkali and acid resistant glass composition, the glass composition consisting essentially of, as percentages by weight of the glass composition:

| | |
|---|---|
| $SiO_2$ | ≥58.0%; |
| $ZrO_2$ | 15.0-20.0%; |
| $Na_2O$ | ≥14.0%; |
| $K_2O$ | ≤0.1%; |
| $Li_2O$ | <0.5%; |
| CaO | 2.5-5.0%; |
| $TiO_2$ | ≥1.0% and ≤4.0%; |
| $Al_2O_3 + Fe_2O_3$ | <1.0%; |
| $Cr_2O_3$ | ≤0.05%; |
| MgO | ≤4.0%; |
| $ZrO_2 + TiO_2$ | ≥17.0%; and |
| $ZrO_2/TiO_2$ | ≥6; | wherein said glass composition is devoid of F,
wherein the difference between the forming temperature and the liquidus temperature of said glass composition is at least 80° C., and
wherein the glass composition has a forming temperature no greater than 1,320° C.

10. A composite comprising:
a plurality of glass strands; and
at least one of an inorganic material and an organic material, wherein the glass strands are formed from a glass composition consisting essentially of, as percentages by weight of the glass composition:

| | |
|---|---|
| $SiO_2$ | ≥58.0%; |
| $ZrO_2$ | 15.0-20.0%; |
| $Na_2O$ | ≥14.0%; |
| $K_2O$ | ≤0.1%; |
| $Li_2O$ | <0.5%; |
| CaO | 2.5-5.0%; |
| $TiO_2$ | ≥1.0% and ≤2.25%; |
| $Fe_2O_3$ | <1.0%; |
| $Al_2O_3$ | >0 and <0.5%; |
| $Cr_2O_3$ | ≤0.05%; |
| $ZrO_2 + TiO_2$ | ≥17.0%; and |
| $ZrO_2/TiO_2$ | ≥6; | wherein the glass composition is devoid of F, and
wherein the glass composition has a forming temperature no greater than 1,320° C.

11. The composite of claim 10, wherein the inorganic material includes highly basic materials.

12. The composite of claim 10, wherein the inorganic material is a cementitious material comprising one or more of cement, concrete, mortar, gypsum, slag, and a compound formed by reaction of lime, silica, and water.

13. The composite of claim 10, wherein the organic material comprises one or more of a thermoplastic material and a thermosetting material.

14. The composite of claim 13, wherein the thermoplastic material includes polyolefins, polyesters, polyamides, polyurethanes, and the blends of these compounds.

15. The composite of claim 13, wherein the thermosetting material includes polyesters, phenolic resins, epoxy resins, polyacrylics, and the blends of these compounds.

\* \* \* \* \*